US012747157B2

(12) United States Patent
Song et al.

(10) Patent No.: US 12,747,157 B2
(45) Date of Patent: Sep. 29, 2026

(54) APPARATUS FOR PRODUCING HYDROGEN GAS

(71) Applicants: HYUNDAI MOTOR COMPANY, Seoul (KR); KIA CORPORATION, Seoul (KR)

(72) Inventors: Han Eol Song, Seongnam-si (KR); Woo Ram Kang, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 1008 days.

(21) Appl. No.: 17/881,580

(22) Filed: Aug. 4, 2022

(65) Prior Publication Data

US 2023/0312339 A1 Oct. 5, 2023

(30) Foreign Application Priority Data

Mar. 17, 2022 (KR) ........................ 10-2022-0033611

(51) Int. Cl.
*C01B 3/24* (2006.01)
*B01D 53/047* (2006.01)

(52) U.S. Cl.
CPC .............. *C01B 3/24* (2013.01); *B01D 53/047* (2013.01); *B01D 2257/108* (2013.01); *C01B 2203/0833* (2013.01); *C01B 2203/0861* (2013.01); *C01B 2203/1235* (2013.01)

(58) Field of Classification Search
None
See application file for complete search history.

(56) References Cited

U.S. PATENT DOCUMENTS

| | | | | |
|---|---|---|---|---|
| 5,597,837 | A * | 1/1997 | Spada | A61K 31/404 514/357 |
| 8,574,422 | B2 | 11/2013 | Beech et al. | |
| 2007/0191655 | A1 | 8/2007 | Gattis et al. | |
| 2009/0035619 | A1 | 2/2009 | Adams | |
| 2009/0272653 | A1 | 11/2009 | Beech et al. | |
| 2010/0254893 | A1* | 10/2010 | Kim | C01B 3/48 423/655 |
| 2011/0062014 | A1 | 3/2011 | Gutsol et al. | |
| 2014/0364517 | A1* | 12/2014 | Selstam | C10K 1/004 422/162 |
| 2021/0245133 | A1* | 8/2021 | Soane | B01D 53/0462 |
| 2023/0303393 | A1* | 9/2023 | Eurlings | C01B 3/56 |

FOREIGN PATENT DOCUMENTS

| | | | |
|---|---|---|---|
| CN | 101734620 | A | 6/2010 |
| CN | 106866344 | A | 6/2017 |
| CN | 110072607 | A | 7/2019 |
| JP | 2013534207 | A | 9/2013 |
| KR | 100583500 | B1 | 5/2006 |
| KR | 101594350 | B1 | 2/2016 |
| WO | 2007116225 | A | 10/2007 |

* cited by examiner

*Primary Examiner* — Brian W Cohen
*Assistant Examiner* — Nathanael Jason Downes
(74) *Attorney, Agent, or Firm* — MCDONNELL BOEHNEN HULBERT & BERGHOFF LLP

(57) ABSTRACT

Disclosed is an apparatus for producing a hydrogen gas according to the present disclosure includes a desulfurizer, a plasma reactor, a first adsorber, and a heat exchanger. The disclosed apparatus does not require additional purification of hydrogen and has excellent energy efficiency by utilizing wasted heat of the produced hydrogen.

6 Claims, 9 Drawing Sheets

APPARATUS FOR PRODUCING HYDROGEN GAS

CROSS-REFERENCE TO RELATED APPLICATION

This application claims the benefit of priority to Korean Patent Application No. 10-2022-0033611, filed in the Korean Intellectual Property Office on Mar. 17, 2022, the entire contents of which are incorporated herein by reference.

TECHNICAL FIELD

The present disclosure relates to an apparatus for producing a hydrogen gas that may be applied to a fuel cell and the like without additional purification as a purity of the produced hydrogen gas is high, and has an excellent energy efficiency by increasing a temperature of a source material by utilizing wasted heat of the produced hydrogen gas.

BACKGROUND

In recent years, hydrogen gas has been spotlighted as an eco-friendly energy source, and thus various methods for producing a hydrogen gas have been suggested. Among the methods for producing a hydrogen gas, a method for plasma-treating a hydrocarbon containing material is eco-friendly as it generates a small amount of side-products such as carbon dioxide. Generally, a material is converted into hydrogen and carbon (for example, carbon black) by decomposing the material in the method for producing a hydrocarbon using plasma. In detail, in the producing method, a plasma state of a high temperature is maintained by igniting air or a plasma gas with an electric arc in an interior of a plasma generator, and a hydrocarbon containing material is converted to hydrogen and carbon by bringing the hydrocarbon containing material into reaction with plasma. Then, because a startup/response time is rapid due to a self-heat of plasma and an internal reaction heat due to thermal decomposition, it is suitable for a large amount of the material and a property of the gas.

For example, Korean Patent No. 1594350 (Patent Document 1) discloses an apparatus for producing hydrogen by using steam plasma, including a steam plasma torch connected to a steam boiler and a microwave generator, a gasification reactor that generates a synthetic gas by bringing stream plasma-activated by microwaves of the microwave generator and powered coal into reaction with each other with flames of a plasma torch at a high temperature, and a heat recovery stream boiler that recovers heat from the synthetic gas of the gasification reactor. However, the conventional method or apparatus for producing hydrogen by using plasma in Patent document 1 requires an operation of additionally purifying carbon monoxide, dust, and the like, which are impurities, which are much included in a synthetic gas generated by using hydrocarbon in a solid state as a material, and has a low energy efficiency as wasted heat of the produced hydrogen is discharged to the air.

SUMMARY

The present disclosure has been made to solve the above-mentioned problems occurring in the prior art while advantages achieved by the prior art are maintained intact.

An aspect of the present disclosure provides an apparatus for producing a hydrogen gas, which does not require additional purification of hydrogen as a purity of the produced hydrogen is high and has excellent energy efficiency by utilizing wasted heat of the produced hydrogen.

The technical problems to be solved by the present disclosure are not limited to the aforementioned problems, and any other technical problems not mentioned herein will be clearly understood from the following description by those skilled in the art to which the present disclosure pertains.

The present disclosure provides an apparatus for producing a hydrogen gas, the apparatus including a desulfurizer that desulfurizes a hydrocarbon containing gas, a plasma reactor that generates the hydrogen containing gas from the desulfurized hydrocarbon containing gas through plasma based pyrolysis, a separator that separates a low-purity hydrogen gas from the hydrogen containing gas, a first adsorber that separates the low-purity hydrogen gas that is separated by the separator to a first high-purity hydrogen gas and a first off gas, through adsorption, and a heat exchanger that exchanges heat between at least a portion of the first off gas discharged from the first adsorber and the low-purity hydrogen gas separated by the separator.

Furthermore, the present disclosure provides an apparatus for producing a hydrogen gas, the apparatus including a desulfurizer that desulfurizes a hydrocarbon containing gas, a plasma reactor that generates the hydrogen containing gas from the desulfurized hydrocarbon containing gas through plasma based pyrolysis, a separator that separates a low-purity hydrogen gas from the hydrogen containing gas, a first adsorber that separates the low-purity hydrogen gas that is separated by the separator to a first high-purity hydrogen gas and a first off gas, through adsorption, and a second adsorber that separates the first off gas to a second high-purity hydrogen gas and a second off gas through adsorption.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
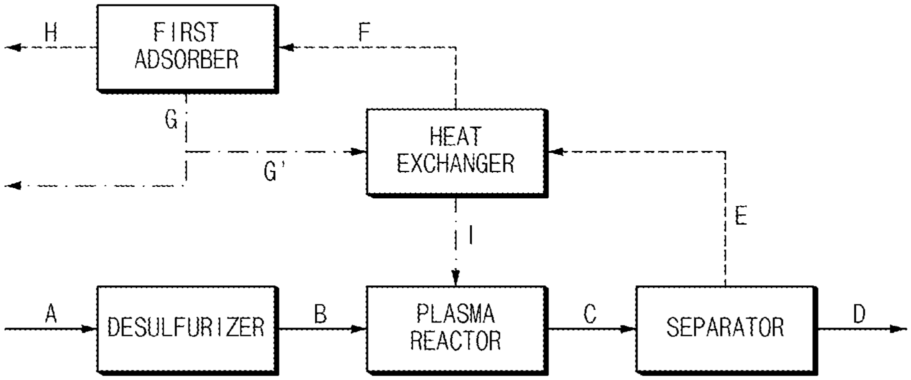
FIG. 1 is a flowchart of an apparatus for producing a hydrogen gas according to an embodiment of the present disclosure.

Hereinafter, the present disclosure will be described in detail.

Apparatus for Producing Hydrogen Gas (a First Embodiment Form)

An apparatus for producing a hydrogen gas according to the present disclosure includes a desulfurizer, a plasma reactor, a first adsorber, and a heat exchanger.

Desulfurizer

The desulfurizer functions to remove sulfur(S) components from a hydrocarbon containing gas.

Generally, any device that may be used to remove sulfur components from the hydrocarbon containing gas may be used as the desulfurizer without any limitation. For example, the desulfurizer may be one, to which a general desulfurization method such as desulfurization through hydrogen purification, desulfurization using addition of acids, or desulfurization using addition of alkalis.

Plasma Reactor

The plasma reactor generates a hydrogen containing gas by plasma-treating the desulfurized hydrocarbon containing gas.

The plasma based pyrolysis may be an operation of mixing the desulfurized hydrocarbon containing gas and plasma and bringing them into reaction with each other.

Then, any plasma that may be generally used when hydrogen is produced may be used as the plasma without any particular limitation, and for example, the plasma may be high-temperature plasma or low-temperature plasma. In detail, the plasma may be high-temperature plasma, and for example, a temperature of the plasma may be 800° C. to 50,000° C. As described above, when the high-temperature plasma is used when the plasma is treated, hydrogen production efficiency may be improved due to a high conversion rate.

Furthermore, the plasma, for example, may be microwave plasma, arc plasma, and the like.

The plasma reactor may include a plasma generating part that generates plasma, and a reaction part that mixes the desulfurized hydrocarbon containing gas and the plasma introduced from the plasma generating part and brings them into reaction with each other. Then, any device that may generate plasma having the above-described characteristics may be used as the plasma generating part without particular limitation.

Separator

The separator separates a low-purity hydrogen gas from the hydrogen containing gas. In further detail, the separator may separate side-products including the low-purity hydrogen gas and carbon from the hydrogen containing gas.

The low-purity hydrogen gas separated by the separator is of a high temperature, and the apparatus for producing a hydrogen gas according to the present disclosure has an excellent energy efficiency by using wasted heat of the low-purity hydrogen gas of the high temperature in preheating of at least a portion of the first off gas discharged from the first adsorber.

In detail, a temperature of the low-purity hydrogen gas separated by the separator may be 500° C. to 2,500° C. or 800° C. to 2,000° C.

First Adsorber

The first adsorber separates the low-purity hydrogen gas that is separated by the separator to a first high-purity hydrogen gas and a first off gas, through adsorption.

Any device that may generally remove impurities in the hydrogen gas may be used as the adsorber without particular limitation, and for example, may be performed through pressure swing adsorption (PSA).

For example, the first adsorber may include four to twelve adsorption towers, and the adsorption towers may be filled with an adsorption agent, and then, the adsorption agent, for example, may include a carbon-based material, a zeolite-based material, and the like, and in detail, may include activated carbon, aluminosilicate, pure silicate, titanosilicate, and aluminophosphate.

Heat Exchanger

The heat exchanger exchanges heat between at least a portion of the first off gas discharged from the first adsorber and the low-purity hydrogen gas separated by the separator. Accordingly, a temperature of the low-purity hydrogen gas separated by the separator decreases, and a temperature of the at least a portion of the first off gas discharged from the first adsorber increases. That is, the wasted heat of the low-purity hydrogen gas is used for preheating the first off gas introduced into the plasma reactor.

Any heat exchanger that may be generally applied to exchange heat between a gas of a high temperature and a gas of a low temperature may be used as the heat exchanger without any particular limitation.

A volume of the first off gas that is supplied to the heat exchanger may be more than 0 volume % and not more than 100 volume % or 40 volume % to 90 volumes of a total volume of the first off gas discharged from the first adsorber. Referring to FIG. 1, a portion of the first off gas G' corresponding to more than 0 volume % and not more than 100 volume % or 40 volume % to 90 volume % of the total volume of the first off gas "G" discharged from the first adsorber is supplied to the heat exchanger. When the volumes of the first off gas that is supplied to the heat exchanger is within the range, an amount of a material that is introduced into the reactor is reduced.

Furthermore, the first off gas discharged from the heat exchanger may be introduced to the plasma reactor. That is, the first off gas discharged from the heat exchanger may be used as a source material of the plasma reactor, together with the hydrocarbon containing gas desulfurized by the desulfurizer. As described above, when the at least a portion of the first off gas is used as a source material of the plasma reactor, an amount of the source material introduced into the reactor may be reduced and thus a production efficiency of the hydrogen gas may be improved.

A temperature of the first off gas discharged from the heat exchanger may be, in certain embodiments, 150° C. to 700° C., or 200° C. to 650° C.

Referring to FIG. 1, the apparatus for producing a hydrogen gas according to an embodiment of the present disclosure may include a desulfurizer that desulfurizes a hydrocarbon containing gas "A", a plasma reactor that generates the hydrogen containing gas "C" from the desulfurized hydrocarbon containing gas "B" through plasma based pyrolysis, a separator that separates from the hydrogen containing gas "C" to the low-purity hydrogen gas "E" and side-products "D" including carbon, a heat exchanger that exchanges heat between the low-purity hydrogen gas "E" separated by the separator and at least a portion G' of the first off gas "G" discharged from the first adsorber, and a first adsorber that separates the low-purity hydrogen gas "F" that was discharge after exchanging heat to a first high-purity hydrogen gas "H" and a first off gas "G", through adsorption. Then, the heat exchanger may exchange heat between the low-purity hydrogen gas "E" and the at least a portion G' of the first off gas to generate the first off gas "I" that exchanged heat with the heat-exchanged low-purity hydrogen gas "F". The first off gas "I" that exchanged heat in the heat exchanger may be introduced into the plasma reactor, together with the desulfurized hydrocarbon containing gas "B".

The apparatus may further include, between the first adsorber and the heat exchanger, a second compressor that compresses the at least a portion of the first off gas discharged from the first adsorber and supplies the compressed at least portion to the heat exchanger.

Second Compressor

The second compressor functions to compress the first off gas with a pressure, by which the first off gas may be injected into a fuel supply system, by compressing the at least a portion of the first off gas, which was discharged from the first adsorber, and supplying the compressed at least a portion to the heat exchanger.

A pressure of the first off gas compressed by the second compressor may be 0.5 MPa to 5.0 MPa or 1.0 MPa to 3.5 MPa. When the pressure of the compressed first off gas is less than the range, it may be impossible to inject the first off gas into the plasma reactor as the fuel supply pressure is not reached, and when the pressure is more than the range, the pressure may exceed a design pressure of a fuel supply system.

The apparatus may further include a flare stack that burns and discharges the remaining portions of the first off gas, which was discharged from the first adsorber and was not introduced into the second compressor.

Any device that may be applied to generally burn a gas and discharge the gas to the air may be applied as the flare stack without particular limitation.

Figure 2:
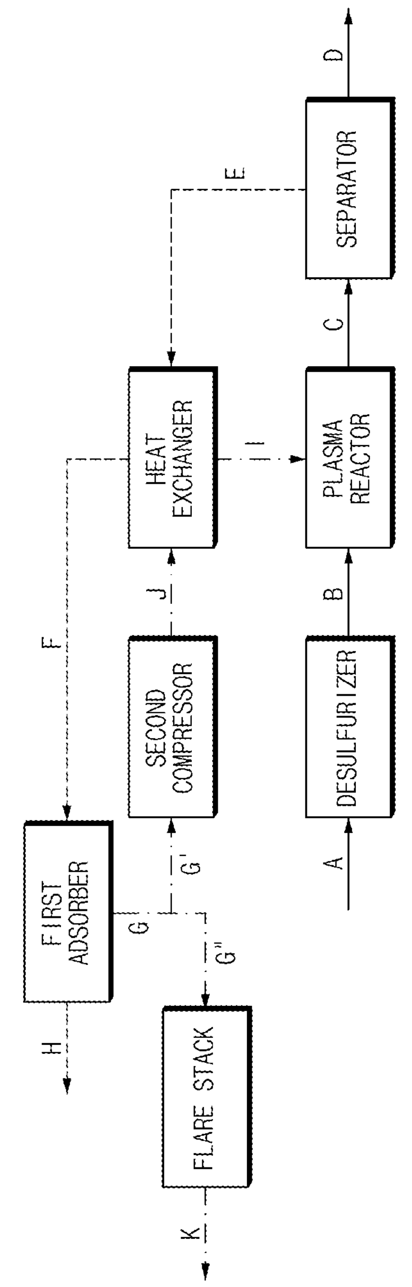
FIG. 2 is a flowchart of an apparatus for producing a hydrogen gas according to an embodiment of the present disclosure.

Referring to FIG. 2, the apparatus for producing a hydrogen gas according to an embodiment of the present disclosure may include a desulfurizer that desulfurizes a hydrocarbon containing gas "A", a plasma reactor that generates the hydrogen containing gas "C" from the desulfurized hydrocarbon containing gas "B" through plasma based pyrolysis, a separator that separates from the hydrogen containing gas "C" to the low-purity hydrogen gas "E" and side-products "D" including carbon, a heat exchanger that exchanges heat between the low-purity hydrogen gas "E" separated by the separator and the first off gas "J" discharged from the second compressor, a first adsorber that separates the low-purity hydrogen gas "F" discharged after exchanging heat to the first high-purity hydrogen gas "H" and the first off gas "G", a second compressor that compresses the at least a portion G' of the first off gas "G" discharged from the first adsorber, and a flare stack that burns and discharges the first off gas G" corresponding to the remaining portions, which was discharged from the first adsorber and was not introduced into the second compressor. Then, the heat exchanger may exchange heat between the low-purity hydrogen gas "E" and the first off gas "J" compressed in the second compressor to generate the first off gas "I" that exchanged heat with the heat-exchanged low-purity hydrogen gas "F". The first off gas "I" that exchanged heat in the heat exchanger may be introduced into the plasma reactor, together with the desulfurized hydrocarbon containing gas "B". Furthermore, the flare stack may discharge the flue gas into the air after burning the remaining first off gas G".

The apparatus for producing a hydrogen gas according to the present disclosure may further include, between the heat exchanger and the first adsorber, a cooler that cools the low-purity hydrogen gas that is discharged after exchanging heat in the heat exchanger, and a first compressor that compresses the low-purity hydrogen gas cooled in the cooler.

Cooler and First Compressor

The cooler functions to enhance an adsorption efficiency of the first adsorber by cooling the low-purity hydrogen gas discharged from the heat exchanger.

Furthermore, any device that may lower the temperature of the hydrogen gas may be used without any particular limitation, and for example, may be a heat exchange type cooler. Then, the heat exchange type cooler may cool the hydrogen gas by exchanging heat between a refrigerant and the hydrogen gas, and the refrigerant, for example, may include water, an antifreeze, and a thermal medium oil.

In detail, a temperature of the hydrogen gas discharged after exchanging heat in the heat exchanger may be, in certain embodiments, 150° C. to 1,050° C. or 200° C. to 650° C. That is, the hydrogen gas that is discharged after exchanging heat in the heat exchanger is of a high temperature. Accordingly, the hydrogen gas that exchanged heat in the heat exchanger and was discharged may enhance adsorption efficiency by further providing the cooler that cools the hydrogen gas before adsorption.

The hydrogen gas cooled by the cooler may be, in certain embodiments, 10° C. to 80° C. or 10° C. to 60° C. When the temperature of the cooled hydrogen gas is less than the range, economic efficiency may decrease due to excessive cooling, and when the temperature is more than the range, the adsorption agent filled in the adsorber may be damaged.

The first compressor functions to increase an adsorption effect by compressing the hydrogen gas cooled by the cooler. When the performance of the first adsorber is made by the PSA, the adsorption effect of the impurities in the hydrogen gas becomes lower when the pressure of the supplied hydrogen gas becomes lower. Accordingly, the hydrogen gas introduced into the first adsorber may be compressed by the first compressor.

Furthermore, any device that may be used to generally compress the hydrogen gas may be used as the first compressor without any particular limitation.

Then, a pressure of the hydrogen gas compressed by the first compressor may be 0.5 MPa to 5.0 MPa or 1.0 MPa to 3.5 MPa. When the pressure of the compressed hydrogen gas is less than the range, it may be impossible to inject the hydrogen gas into the plasma reactor as the fuel supply pressure is not reached, and when the pressure is more than the range, the pressure may exceed a design pressure of a fuel supply system.

Figure 3:
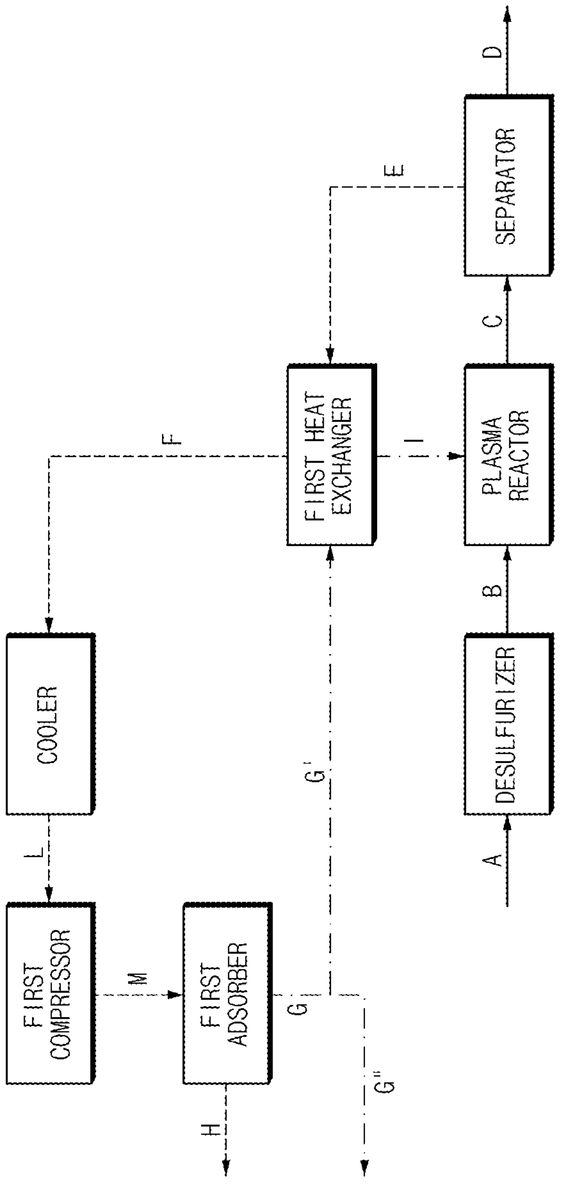
FIG. 3 is a flowchart of an apparatus for producing a hydrogen gas according to an embodiment of the present disclosure.

Referring to FIG. 3, the apparatus for producing a hydrogen gas according to an embodiment of the present disclosure may include a desulfurizer that desulfurizes a hydrocarbon containing gas "A", a plasma reactor that generates the hydrogen containing gas "C" from the desulfurized hydrocarbon containing gas "B" through plasma based pyrolysis, a separator that separates from the hydrogen containing gas "C" to the low-purity hydrogen gas "E" and side-products "D" including carbon, a heat exchanger that exchanges heat between the low-purity hydrogen gas "E" separated by the separator and at least a portion G' of the first off gas "G" discharged from the first adsorber, a cooler that cools the low-purity hydrogen gas "F" discharged from the heat exchanger, a first compressor that compresses the low-purity hydrogen gas "L" cooled in the cooler, and a first adsorber that separates the low-purity hydrogen gas "M" compressed and discharged by the first compressor to the first high-purity hydrogen gas "H" and the first off gas "G" through adsorption. Then, the heat exchanger may exchange heat between the low-purity hydrogen gas "E" and the at least a portion G' of the first off gas to generate the first off gas "I" that exchanged heat with the heat-exchanged low-purity hydrogen gas "F". The first off gas "I" that exchanged heat in the heat exchanger may be introduced into the plasma reactor, together with the desulfurized hydrocarbon containing gas "B". Reference numeral G" of FIG. 3 is the first off gas corresponding to the remaining portions, which were discharged from the first adsorber and were not introduced into the second compressor.

Figure 4:
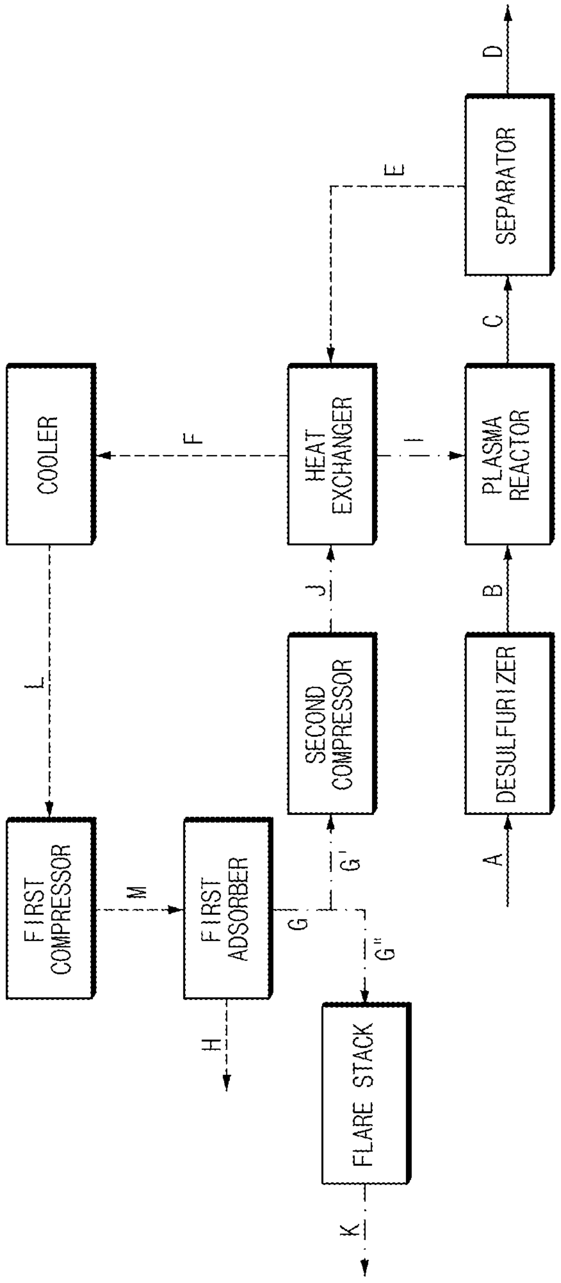
FIG. 4 is a flowchart of an apparatus for producing a hydrogen gas according to an embodiment of the present disclosure.

Referring to FIG. 4, the apparatus for producing a hydrogen gas according to an embodiment of the present disclosure may include a desulfurizer that desulfurizes a hydrocarbon containing gas "A", a plasma reactor that generates the hydrogen containing gas "C" from the desulfurized hydrocarbon containing gas "B" through plasma based pyrolysis, a separator that separates from the hydrogen containing gas "C" to the low-purity hydrogen gas "E" and side-products "D" including carbon, a heat exchanger that exchanges heat between the low-purity hydrogen gas "E" separated by the separator and the first off gas "J" discharged from the second adsorber, a cooler that cools the low-purity hydrogen gas "F" discharged from the heat exchanger, a first compressor that compresses the low-purity hydrogen gas "L" cooled by the cooler, a first adsorber that separates the low-purity hydrogen gas "M" compressed and discharged by the first compressor to the first high-purity hydrogen gas "H" and the first off gas "G" through adsorption, a second compressor that compresses at least a portion G' of the first off gas "G" discharged from the first adsorber and supplies the compressed at least a portion to the heat exchanger, a flare stack that burns and discharges the first off gas corresponding to the remaining portions G", which were discharged from the first adsorber and were not introduced into the first compressor.

Furthermore, the hydrogen gas "H" produced by the above-described producing apparatus may have a purity that is as high as 99.97% or more and may be used as a source material, for example, of a fuel cell without any additional purification. Furthermore, the apparatus for producing the hydrogen gas has an excellent energy efficiency because it uses the wasted heat of the produced hydrogen to prevent the material.

Apparatus for Producing Hydrogen Gas (a Second Embodiment Form)

An apparatus for producing a hydrogen gas according to the present disclosure includes a desulfurizer, a plasma reactor, a first adsorber, and a second adsorber.

Desulfurizer

The desulfurizer functions to remove sulfur(S) components from a hydrocarbon containing gas.

Generally, any device that may be used to remove sulfur components from the hydrocarbon containing gas may be used as the desulfurizer without any limitation. For example, the desulfurizer may be one, to which a general desulfurization method such as desulfurization through hydrogen purification, desulfurization using addition of acids, or desulfurization using addition of alkalis.

Plasma Reactor

The plasma reactor generates a hydrogen containing gas by plasma-treating the desulfurized hydrocarbon containing gas.

The plasma based pyrolysis may be an operation of mixing the desulfurized hydrocarbon containing gas and plasma and bringing them into reaction with each other.

Then, any plasma that may be generally used when hydrogen is produced may be used as the plasma without any particular limitation, and for example, the plasma may be high-temperature plasma or low-temperature plasma. In detail, the plasma may be high-temperature plasma, and for example, a temperature of the plasma may be 800° C. to 50,000° C. in certain embodiments. As described above, when the high-temperature plasma is used when the plasma is treated, a hydrogen production efficiency may be improved due to a high conversion rate.

Furthermore, the plasma, for example, may be microwave plasma, arc plasma, and the like.

The plasma reactor may include a plasma generating part that generates plasma, and a reaction part that mixes the desulfurized hydrocarbon containing gas and the plasma introduced from the plasma generating part and brings them into reaction with each other. Then, any device that may generate plasma having the above-described characteristics may be used as the plasma generating part without particular limitation.

Separator

The separator separates a low-purity hydrogen gas from the hydrogen containing gas. In detail, the separator may separate side-products including the low-purity hydrogen gas and carbon from the hydrogen containing gas.

The low-purity hydrogen gas separated by the separator is of a high temperature, and the apparatus for producing a hydrogen gas according to the present disclosure has an excellent energy efficiency by using wasted heat of the low-purity hydrogen gas of the high temperature in preheating of at least a portion.of the first off gas discharged from the first adsorber.

In detail, a temperature of the low-purity hydrogen gas separated by the separator may be, in certain embodiments, 500° C. to 2,500° C. or 800° C. to 2,000° C.

First Adsorber

The first adsorber separates the low-purity hydrogen gas that is separated by the separator to a first high-purity hydrogen gas and a first off gas, through adsorption.

Any device that may generally remove impurities in the hydrogen gas may be used as the first adsorber without particular limitation, and for example, may be performed through pressure swing adsorption (PSA).

For example, the first adsorber may include four to twelve adsorption towers, and the adsorption towers may be filled with an adsorption agent, and then, the adsorption agent, for example, may include a carbon-based material, a zeolite-based material, and the like, and in detail, may include activated carbon, aluminosilicate, pure silicate, titanosilicate, and aluminophosphate.

Second Adsorber

The second adsorber separates the first off gas to the second high-purity hydrogen gas and the second off gas through adsorption.

Any device that may generally remove impurities in the hydrogen gas may be used as the second adsorber without particular limitation, and for example, may be performed through pressure swing adsorption (PSA).

For example, the second adsorber may include four to twelve adsorption towers, and the adsorption towers may be filled with an adsorption agent, and then, the adsorption agent, for example, may include a carbon-based material, a zeolite-based material, and the like, and in detail, may include activated carbon, aluminosilicate, titanosilicate, and aluminophosphate.

Figure 5:
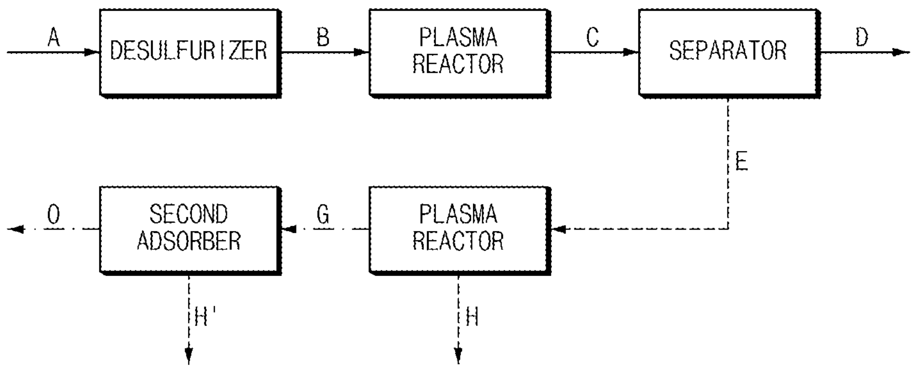
FIG. 5 is a flowchart of an apparatus for producing a hydrogen gas according to an embodiment of the present disclosure.

Referring to FIG. 5, the apparatus for producing a hydrogen gas according to an embodiment of the present disclosure may include a desulfurizer that desulfurizes 10 hydrocarbon containing gas "A", a plasma reactor that generates the hydrogen containing gas "C" from the desulfurized hydrocarbon containing gas "B" through plasma based pyrolysis, a separator that separates from the hydrogen containing gas "C" to the low-purity hydrogen gas "E" and side-products "D" including carbon, a first adsorber that separates the low-purity hydrogen gas "E" separated by the separator to the first high-purity hydrogen gas "H" and the first off gas "G" through adsorption, and a second adsorber that separates the first off gas "G" discharged from the first adsorber to the second high-purity hydrogen gas H' and the second off gas "O" through adsorption.

The apparatus for producing a hydrogen gas according to the present disclosure may further include, between the separator and the first adsorber, a cooler that cools the low-purity hydrogen gas that is discharged from the separator, and a first compressor that compresses the low-purity hydrogen gas cooled in the cooler.

Cooler and First Compressor

The cooler functions to enhance an adsorption efficiency of the first adsorber by cooling the low-purity hydrogen gas discharged from the separator.

Furthermore, any device that may lower the temperature of the hydrogen gas may be used without any particular limitation, and for example, may be a heat exchange type cooler. Then, the heat exchange type cooler may cool the hydrogen gas by exchanging heat between a refrigerant and the hydrogen gas, and the refrigerant, for example, may include water, an antifreeze, and a thermal medium oil.

In detail, a temperature of the low-purity hydrogen gas discharged by the separator may be, in some embodiments, 500° C. to 2,500° C. or 800° C. to 2,000° C. That is, the low-purity hydrogen gas discharged from the separator is of a high temperature. Accordingly, the low-purity hydrogen gas discharged from the separator may enhance adsorption efficiency by further providing the cooler that cools the low-purity hydrogen gas before the low-purity hydrogen gas is adsorbed by the first adsorber.

The hydrogen gas cooled by the cooler may be, in some embodiments, 10° C. to 80° C. or 10° C. to 60° C. When the temperature of the cooled hydrogen gas is less than the range, economic efficiency may decrease due to excessive cooling, and when the temperature is more than the range, the adsorption agent filled in the adsorber may be damaged.

The first compressor functions to enhance adsorption efficiency by compressing the low-purity hydrogen gas cooled by the cooler. When the performance of the first adsorber is made by the PSA, the adsorption effect of the impurities in the hydrogen gas becomes lower when the pressure of the supplied hydrogen gas becomes lower. Accordingly, the hydrogen gas introduced into the first adsorber may be compressed by the first compressor.

Furthermore, any device that may be used to generally compress the hydrogen gas may be used as the first compressor without any particular limitation.

Then, a pressure of the hydrogen gas compressed by the first compressor may be, in some embodiments, 0.5 MPa to 5.0 MPa or 1.0 MPa to 3.5 MPa. When the pressure of the hydrogen gas compressed by the first compressor is less than the range, the effect of adsorbing impurities in the hydrogen gas decreases, and when the pressure is more than the range, the adsorption agent filled in the first adsorber may be damaged.

Figure 6:
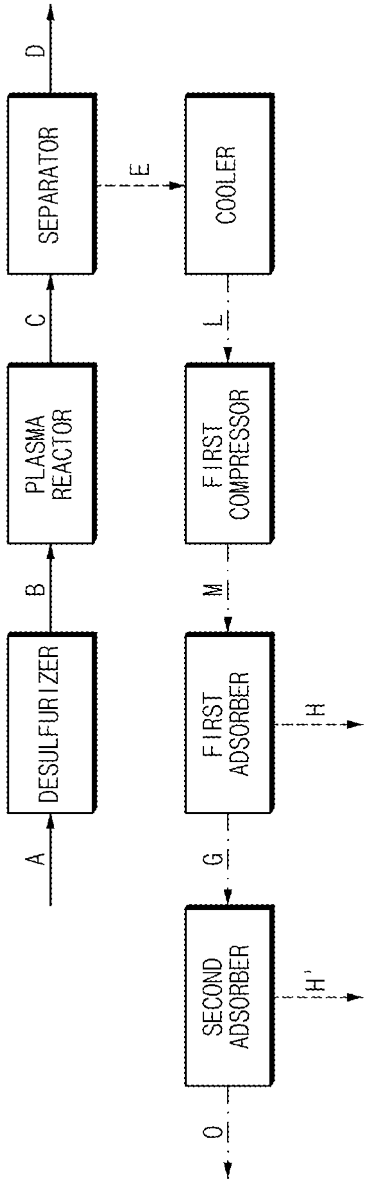
FIG. 6 is a flowchart of an apparatus for producing a hydrogen gas according to an embodiment of the present disclosure.

Referring to FIG. 6, the apparatus for producing a hydrogen gas according to an embodiment of the present disclosure may include a desulfurizer that desulfurizes a hydrocarbon containing gas "A", a plasma reactor that generates the hydrogen containing gas "C" from the desulfurized hydrocarbon containing gas "B" through plasma based pyrolysis, a separator that separates from the hydrogen containing gas "C" to the low-purity hydrogen gas "E" and side-products "D" including carbon, a cooler that cools the low-purity hydrogen gas "E" separated by the separator, a first compressor that compresses the low-purity hydrogen gas "L" cooled by the cooler, a first adsorber that separates the first high-purity hydrogen gas "H" and the first off gas "G" by adsorbing the low-purity hydrogen gas "M" compressed and discharged by the first compressor, and a second adsorber that separates the first off gas "G" discharged from the first adsorber to the second high-purity hydrogen gas H' and the second off gas "O" through adsorption.

The apparatus for producing a hydrogen gas according to the present disclosure may further include, between the first adsorber and the second adsorber, a second compressor that compresses the first off gas discharged from the first adsorber.

Second Compressor

The second compressor functions to increase adsorption effect in the second compressor by compressing the first off gas. When the performance of the second adsorber is made by the PSA, the adsorption effect of the impurities in the hydrogen gas becomes lower when the pressure of the supplied hydrogen gas becomes lower. Accordingly, the hydrogen gas introduced into the second adsorber may be compressed by the second compressor.

Furthermore, any device that may be used to generally compress the hydrogen gas may be used as the second compressor without any particular limitation.

Then, a pressure of the hydrogen gas compressed by the first compressor may be, in some embodiments, 0.5 MPa to 5.0 MPa or 1.0 MPa to 3.5 MPa. When the pressure of the hydrogen gas compressed by the second compressor is less than the range, the effect of adsorbing impurities in the hydrogen gas in the second adsorber decreases, and when the pressure is more than the range, the adsorption agent filled in the second adsorber may be damaged.

Figure 7:
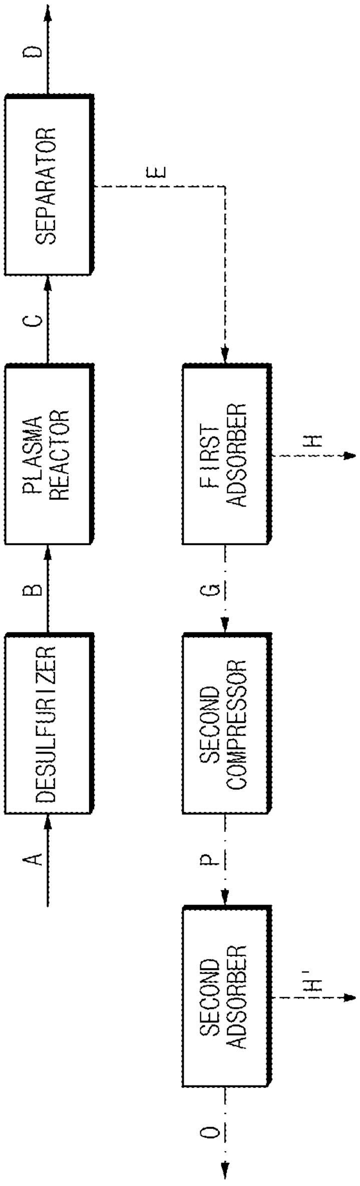
FIG. 7 is a flowchart of an apparatus for producing a hydrogen gas according to an embodiment of the present disclosure.

Referring to FIG. 7, the apparatus for producing a hydrogen gas according to an embodiment of the present disclosure may include a desulfurizer that desulfurizes a hydrocarbon containing gas "A", a plasma reactor that generates the hydrogen containing gas "C" from the desulfurized hydrocarbon containing gas "B" through plasma based pyrolysis, a separator that separates from the hydrogen containing gas "C" to the low-purity hydrogen gas "E" and side-products "D" including carbon, a first adsorber that separates the low-purity hydrogen gas "E" separated by the separator to the first high-purity hydrogen gas "H" and the first off gas "G" through adsorption, a second compressor that compresses the first off gas "G" discharged from the first adsorber, and a second adsorber that separates the first off gas "P" compressed by the second compressor to the second high-purity hydrogen gas H' and the second off gas "O" through adsorption.

Flare Stack

The apparatus for producing a hydrogen gas may further include a flare stack that burns and discharges the second off gas discharged from the second adsorber.

Any device that may be applied to generally burn a gas and discharge the gas to the air may be applied as the flare stack without particular limitation.

Figure 8:
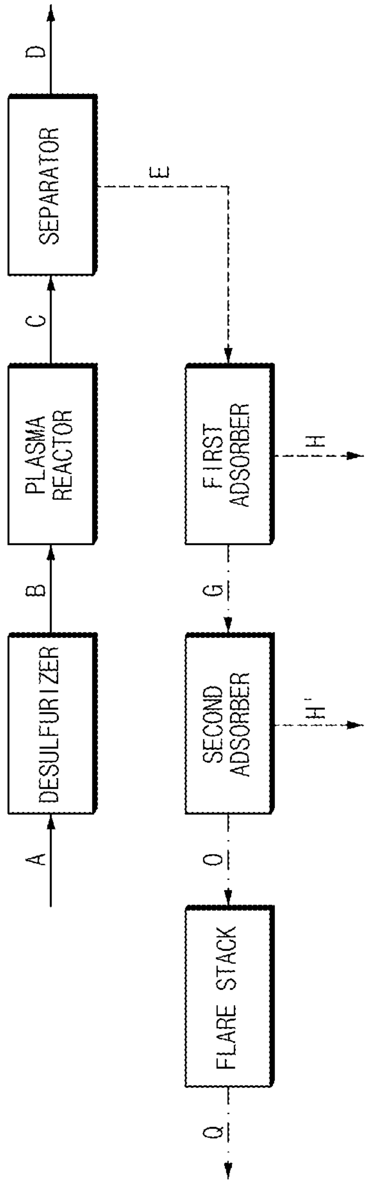
FIG. 8 is a flowchart of an apparatus for producing a hydrogen gas according to an embodiment of the present disclosure.

Referring to FIG. 8, the apparatus for producing a hydrogen gas according to an embodiment of the present disclosure may include a desulfurizer that desulfurizes a hydrocarbon containing gas "A", a plasma reactor that generates the hydrogen containing gas "C" from the desulfurized hydrocarbon containing gas "B" through plasma based pyrolysis, a separator that separates from the hydrogen containing gas "C" to the low-purity hydrogen gas "E" and side-products "D" including carbon, a first adsorber that separates the low-purity hydrogen gas "E" separated by the separator to the first high-purity hydrogen gas "H" and the first off gas "G" through adsorption, a second adsorber that separates the first off gas "G" discharged from the first adsorber to the second high-purity hydrogen gas H' and the second off gas "O" through adsorption, and a flare stack that burns and discharges the second doff gas "O". Then, the flare stack may discharge flue gas "Q".

Figure 9:
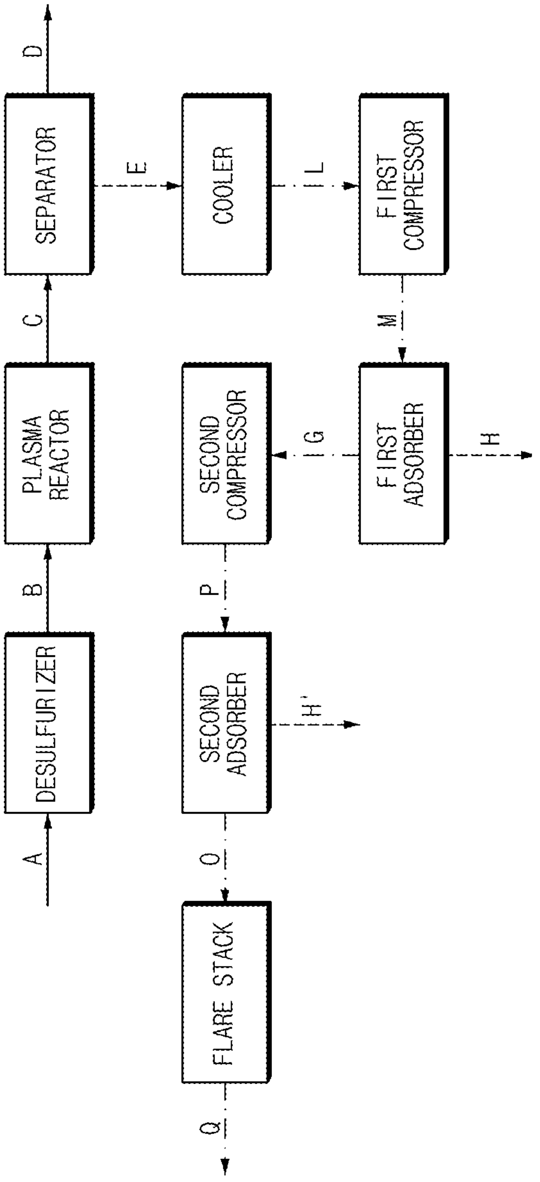
FIG. 9 is a flowchart of an apparatus for producing a hydrogen gas according to an embodiment of the present disclosure.

Referring to FIG. 9, the apparatus for producing a hydrogen gas according to an embodiment of the present disclosure may include a desulfurizer that desulfurizes a hydrocarbon containing gas "A", a plasma reactor that generates the hydrogen containing gas "C" from the desulfurized hydrocarbon containing gas "B" through plasma based pyrolysis, a separator that separates from the hydrogen containing gas "C" to the low-purity hydrogen gas "E" and side-products "D" including carbon, a cooler that cools the low-purity hydrogen gas "E" separated by the separator, a first compressor that compresses the low-purity hydrogen gas "L" cooled by the cooler, a first adsorber that separates the first high-purity hydrogen gas "H" and the first off gas "G" by adsorbing the low-purity hydrogen gas "M" compressed and discharged by the first compressor, a second compressor that compresses the first off gas "G" discharged from the first adsorber, a second adsorber that separates the first off gas "P" discharged from the second adsorber to the second high-purity hydrogen gas H' and the second off gas "O" through adsorption, and a flare stack that burns and discharges the second off gas "O". Then, the flare stack may discharge flue gas "Q".

A purity of the hydrogen produced by the apparatus for producing a hydrogen gas according to the present disclosure, which has been described above, is as high as 99.97% or more, a fuel for a fuel cell and the like may be used without additional purification. Furthermore, the apparatus for producing the hydrogen gas increases a production rate of the hydrogen gas by additionally purifying the off gas and has an excellent economic efficiency.

Hereinafter, the present disclosure will be described in more detail through the embodiments. However, the embodiments are provided simply to help understanding of the present disclosure and the scope of the present disclosure is not limited to the embodiments in any meaning.

EMBODIMENT

First Embodiment Producing of Hydrogen Gas

A hydrogen gas was produced by using the apparatus for producing a hydrogen gas, which has the structure of FIG. 4. Then, methane gas was used as the hydrocarbon containing gas "A" that is the material, and an amount of the first off gas "G" corresponding to 50 volumes of the total volume thereof was introduced into the second compressor. A reactor using microwave plasma of a high temperature of 1,000° C. or more was used as the plasma reactor, and a heat exchange type cooler was used as the cooler. Moreover, a temperature of the hydrogen gas "E" separated by the separator was 1,500±300° C., and a temperature of the hydrogen gas "F" discharged after exchanging heat in the first heat exchanger was 500±150° C. Furthermore, a temperature of the hydrogen gas "L" cooled by the cooler was 40±20° C., a pressure of the hydrogen gas "M" compressed by the first compressor was 2.0±1.0 MPa, and the first adsorber included an adsorption tower filled with active carbon and alumina. Furthermore, a pressure of the hydrogen gas "M" compressed by the second compressor was 3.0±2.0 MPa.

A system efficiency of the produced hydrogen gas was calculated through a method using hydrogen gas "H"/(electricity+hydrocarbon containing gas A) (an enthalpy-based calorie). Then, the apparatus were designed to suitable for ISO 14687, and the results are represented in Table 1.

Second Embodiment

A hydrogen gas was produced through the same method as that of the first embodiment, except that an amount of the first off gas "G" corresponding to 83 volumes of the total volume thereof was introduced into the second compressor.

Third Embodiment

A hydrogen gas was produced by using the apparatus for producing a hydrogen gas which has the structure of FIG. 9. Then, a methane gas was used as the hydrocarbon containing gas "A" that is a material, and the second adsorber including adsorption towers filled with active carbon and alumina was used.

A method for calculating or measuring system efficiencies and purities of the produced hydrogen gases was the same as that of the first embodiment, and the results are represented in Table 1.

Comparative Example 1

A hydrogen gas was produced through the same method as that of the third embodiment, except that the second compressor and the second adsorber in FIG. 9 were not used, and the results are represented in Table 1.

TABLE 1

| | Unit | Comparative example 1 | First Embodiment | Second Embodiment | Third Embodiment |
|---|---|---|---|---|---|
| Re-circulation Rate of Off Gas | % | — | 50 volume % | 83 volume % | — |
| Feed gas | $Nm^3/hr$ | 133.7 | 118.2 | 107.9 | 109.5 |
| Electricity Consumption | kW | 370 | 322 | 322 | 322 |
| Product Hydrogen | kg/d | 430 | 430 | 430 | 430 |
| System Efficiency of Hydrogen Gas | % | 39.4 | 44.7 | 48 | 47.5 |

As may be seen in Table 1, the system efficiencies of the hydrogen gases of the first to third embodiments were as remarkably excellent as 44% or more as compared with Comparative Example 1, and the energy efficiencies thereof were excellent as the electricity consumption was low.

A purity of the hydrogen produced by the apparatus for producing a hydrogen gas according to the present disclosure, which has been described above, is as high as 99.97% or more, a fuel for a fuel cell and the like may be used without additional purification. Furthermore, the apparatus for producing the hydrogen gas according to an embodiment of the present disclosure has excellent energy efficiency because it uses the wasted heat of the produced hydrogen to prevent the material. The apparatus for producing a hydrogen gas according to another embodiment of the present disclosure increases a production rate of a hydrogen gas by additionally purifying the off gas whereby an economic efficiency thereof is excellent.

What is claimed is:

1. An apparatus for producing a hydrogen gas, the apparatus comprising:

a desulfurizer configured to desulfurize a hydrocarbon containing gas;

a plasma reactor configured to generate the hydrogen containing gas from the desulfurized hydrocarbon containing gas through plasma based pyrolysis;

a separator configured to separate a low-purity hydrogen gas from the hydrogen containing gas;

a first adsorber configured to separate the low-purity hydrogen gas that is separated by the separator to a first high-purity hydrogen gas and a first off gas, through adsorption; and a heat exchanger configured to exchange heat between at least a portion of the first off gas discharged from the first adsorber and the low-purity hydrogen gas separated by the separator, wherein the first off gas discharged from the heat exchanger is introduced into the plasma reactor.

2. The apparatus of claim 1, further comprising, between the heat exchanger and the first adsorber:

a cooler configured to cool the low-purity hydrogen gas that is discharged from the heat exchanger; and a first compressor configured to compress the low-purity hydrogen gas cooled in the cooler.

3. The apparatus of claim 1, further comprising, between the first adsorber and the heat exchanger:

a second compressor configured to compress at least a portion of the first off gas that is discharged from the first adsorber and supply the compressed the compressed first off gas to the heat exchanger.

4. The apparatus of claim 3, further comprising:

a flare stack configured to burn and discharge the remaining portions of the first off gas, which was discharged from the first adsorber and was not introduced into the second compressor.

5. The apparatus of claim 1, wherein the first off gas that is supplied to the heat exchanger is more than 0 volume % and not more than 100 volume % of a total volume of the first off gas discharged from the first adsorber.

6. The apparatus of claim 1, wherein the first adsorber performs pressure swing adsorption (PSA).

* * * * *